United States Patent [19]

Reinartz et al.

[11] Patent Number: 4,828,333

[45] Date of Patent: May 9, 1989

[54] SLIP-CONTROLLED BRAKE SYSTEM

[75] Inventors: Hans-Dieter Reinartz, Frankfurt am Main; Helmut Steffes, Hattersheim, both of Fed. Rep. of Germany

[73] Assignee: Alfred Teves GmbH, Frankfurt am Main, Fed. Rep. of Germany

[21] Appl. No.: 227,942

[22] Filed: Aug. 3, 1988

[30] Foreign Application Priority Data

Aug. 7, 1987 [DE] Fed. Rep. of Germany ....... 3726302

[51] Int. Cl.$^4$ .......................... B60T 8/32; B60T 8/44; B60T 13/12
[52] U.S. Cl. ...................... 303/100; 60/534; 60/545; 60/547.1; 188/345; 303/52; 303/116; 303/119
[58] Field of Search ........................ 303/100, 113–119, 303/92, 11, 110, 10, 50, 52; 188/345, 181, 358, 359; 91/369.1, 369.2, 369.3, 376 R; 60/545, 534, 547.1, 548, 547.2, 547.3, 552, 554, 555, 581

[56] References Cited

U.S. PATENT DOCUMENTS

| 3,979,153 | 9/1976 | Ingram et al. | 303/114 X |
|---|---|---|---|
| 4,254,623 | 3/1981 | Dauvergne | 60/548 |
| 4,398,389 | 8/1983 | Horvath | 303/10 X |
| 4,422,293 | 12/1983 | Ewald | 60/547.1 |
| 4,463,561 | 8/1984 | Leiber | 60/548 X |
| 4,568,130 | 2/1986 | Leiber | 303/114 X |
| 4,576,004 | 3/1986 | Bach | 60/547.1 |
| 4,576,417 | 3/1986 | Dobner | 303/114 X |
| 4,580,847 | 4/1986 | Burgdorf | 303/100 |
| 4,582,365 | 4/1986 | Belart | 60/547.1 X |
| 4,603,918 | 8/1986 | Leiber et al. | 60/547.1 X |
| 4,620,750 | 11/1986 | Leiber | 303/114 |
| 4,653,813 | 3/1987 | Burgdorf | 303/100 X |
| 4,655,511 | 4/1987 | Leiber | 303/50 X |
| 4,662,687 | 5/1987 | Leiber | 303/110 |
| 4,715,661 | 12/1987 | Leiber | 303/114 X |
| 4,729,611 | 3/1988 | Kircher et al. | 188/358 X |
| 4,730,877 | 3/1988 | Seibert et al. | 303/116 X |

FOREIGN PATENT DOCUMENTS

| 2176855 | 1/1987 | United Kingdom | 303/114 |
|---|---|---|---|
| 2187521 | 9/1987 | United Kingdom | 303/114 |
| 2191552 | 12/1987 | United Kingdom | 303/114 |
| 2197402 | 5/1988 | United Kingdom | 303/114 |

Primary Examiner—Douglas C. Butler
Attorney, Agent, or Firm—James B. Raden

[57] ABSTRACT

A system is disclosed including valves which are opened or closed dependent upon the position of master cylinder pistons. Upon commencement of slip control, pumps supply fluid either into the slip control cycle or into the working chambers depending upon the position of the pistons. As a result, the pistons are reset until a pin of the valve reaches a ramp or cam and the valve opens. When the valve is open at the start of the control, the pumps first supply fluid into the open cycle, and the pressure fluid discharged from the wheel brakes for slip control is replenished out of the pressure chambers until the pin contacts the ramp or cam whereby pressure fluid supply from the pumps takes place.

11 Claims, 2 Drawing Sheets

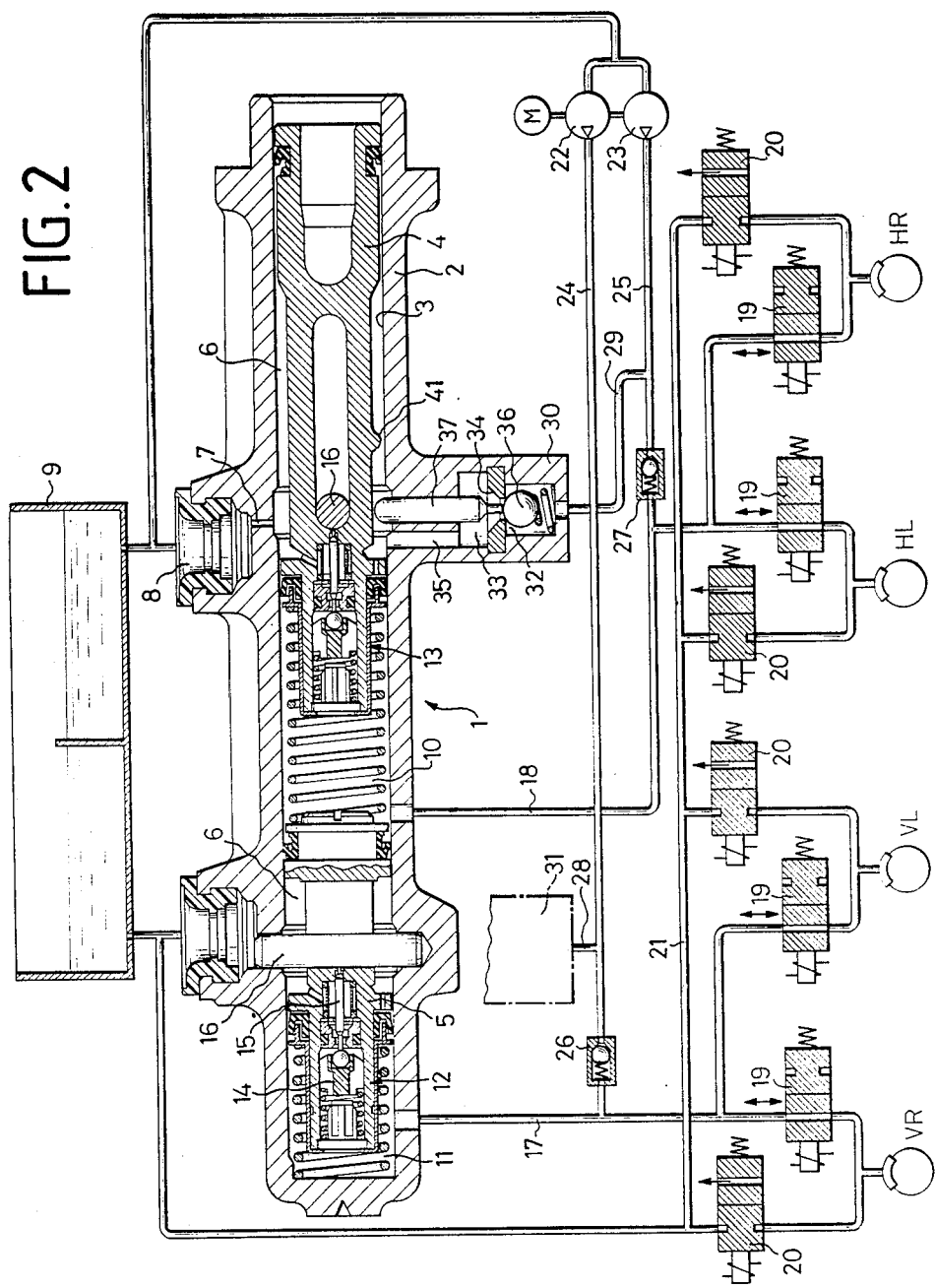

SLIP-CONTROLLED BRAKE SYSTEM

BACKGROUND OF THE INVENTION

The present invention relates to a slip-controlled brake system.

A similar brake system is described in German published patent application No. P 36 27 000. The principle function of the brake system therein is as follows: when brake slip control commences, pumps are driven by a motor, and delivered pressure fluid is fed into the working chambers of a master cylinder. As a result, the pistons of the master cylinder and, thus, the brake pedal are returned to their initial positions. As soon as this initial position is reached, the central valves in the master cylinder open until a throttling position is reached so that just enough pressure fluid discharges from the working chambers into the supply reservoir as is required in order to generate pressure in the working chambers that is proportional to the pedal force. Accordingly, the wheel brakes are supplied with pressure fluid from the pump during a slip action that is under pressure proportional to pedal force.

The prior system has the disadvantage that the pedal is returned to its initial position (which is the brake's release position) upon commencement of a slip control action. Some drivers sense this to be unpleasant particularly when braking is performed at a high frictional value in which case the pedal is depressed far down and has to cover the entire actuating travel when resetting.

SUMMARY OF THE INVENTION

The object of the present invention is to achieve resetting of the brake pedal by simple means and in such a fashion that the resetting is not felt to be unpleasant by the driver.

This object is achieved by providing for the pressure side of the pump to communicate with the supply reservoir via a second pressure fluid conduit in which a shut-off valve is inserted. This shut-off valve is opened or closed dependent on the position of the operating piston.

In a simple manner, the shut-off valve can be a seat valve which is arranged at the master cylinder which is actuated by a ramp or a cam at the master cylinder piston.

Depending on whether a ramp or a cam is employed, a somewhat different pedal resetting mechanism is provided for. In any case, in the event of slip control, movement of the pedal over the entire possible actuating distance is avoided.

Although it is advantageous to have the valve actuated by means of the operating piston, the valve may also be actuated by other parts of the hydraulic system such as, for example, by the booster piston or by the pedal. It must merely be assured that these parts are displaced jointly with the operating piston.

The invention likewise is applicable to a dual-circuit brake system, wherein the braking pressure generator is formed by a tandem master cylinder with one pump provided for each brake circuit. In such a system, two valves are utilized with one valve being operated by the push-rod piston and the other valve being operated by the floating piston of the master cylinder.

BRIEF DESCRIPTION OF THE DRAWING

The invention is illustrated in the Drawings in which:

FIG. 2 is a partial cross-sectional, partial schematic representation of a brake system including an alternative structure for the actuation of the shut-off valve.

DETAILED DESCRIPTION OF A PREFERRED EMBODIMENT

Figure 1:
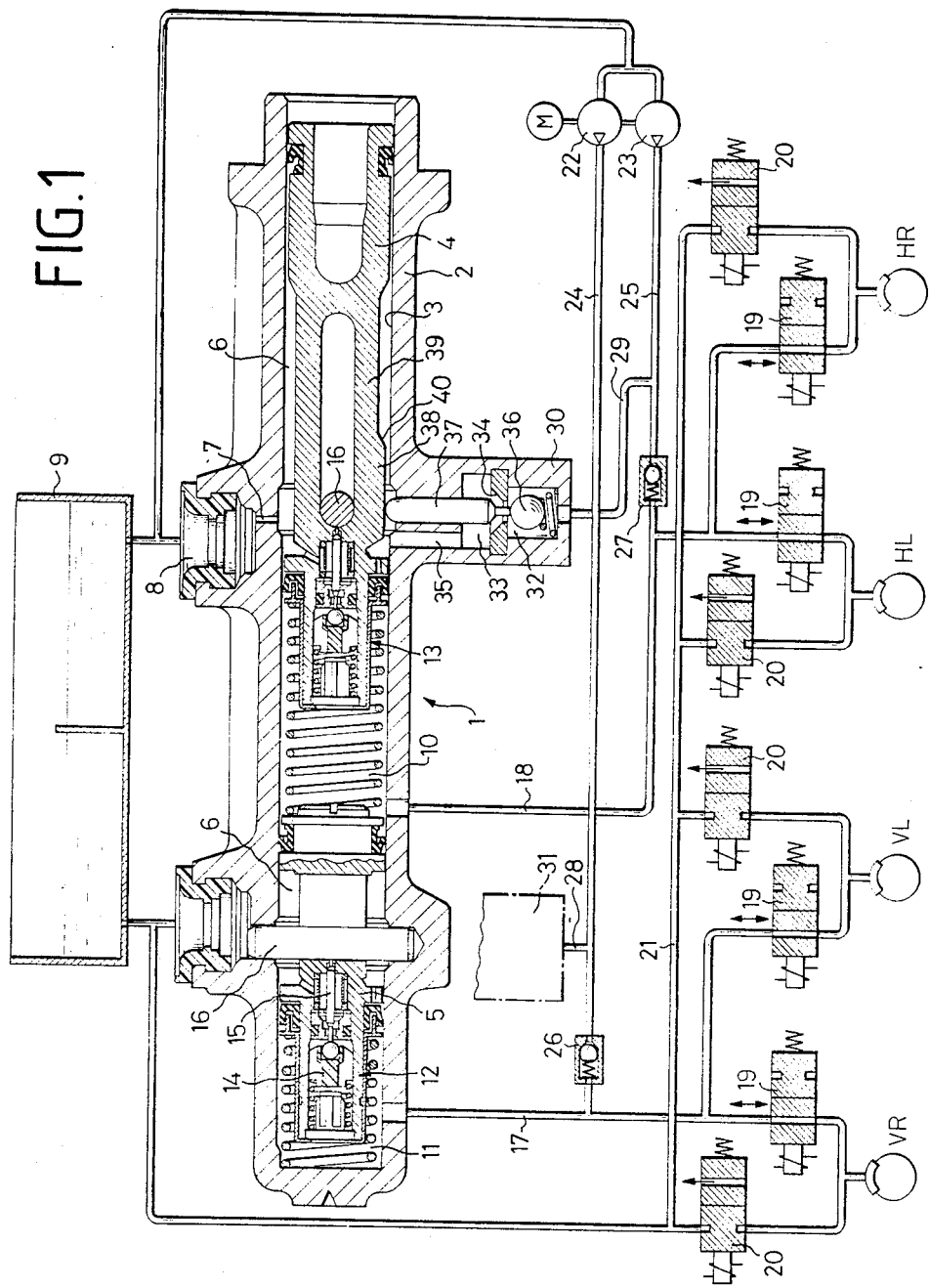
FIG. 1 is a partial cross-sectional, partial schematic representation of a brake system according to the invention.

The brake system comprises a braking pressure generator including a tandem master cylinder 1 which is operated by a pedal force. This pedal force can be boosted by a non-illustrated pneumatic or hydraulic booster. The tandem master cylinder 1 is composed of a housing 2 containing a longitudinal bore 3. The longitudinal bore 3 sealingly guides a push-rod piston 4 and a floating piston 5. These pistons 4 and 5 have a waist in their mid-portions, whereby in each case an annular chamber 6 is formed which communicates with the supply reservoir 9 via a bore 7 and a port 8. The pistons 4 and 5 confine two working chambers 10 and 11. The working chambers 10 and 11 are in communication with an annular chamber 6 by way of central valves 12, 13 arranged in the pistons 4, 5. These central valves 12, 13 are formed substantially by a closure member 14, a tappet 15 and a pin 16 formed fast with the housing. In the brake's release position (initial position) which is shown in the Drawing, the tappet 15 abuts on the pin 16 on the housing and keeps the closure member 14 in its opened position, thereby establishing a pressure fluid connection between the respective working chamber 10 or 11 and the annular chamber 6 and, thus, with the supply reservoir 9. Both central valves 12, 13 are of like design. When the brake is applied, the push-rod piston 4 is displaced first, whereby the tappet 15 separates from the pin 16 and is no longer able to keep the closure member 14 in the opened position. The central valve closes so that at first, upon further displacement of the push-rod piston 4, pressure develops in the working chamber 10 which results in displacement of the floating piston 5. The central valve 12 then also closes and pressure develops in the working chamber 11.

The working chambers 10, 11 connect through pressure lines 17, 18 with the wheel brakes. In the illustrated embodiment, the wheel brakes of the front wheels VR and VL are assigned to the working chamber 11, while the wheel brakes of the rear wheels HL and HR are allocated to the working chamber 10. Each wheel brake includes one inlet valve and one outlet valve 19, 20 which are actuated by a slip control apparatus and which, alternatively, establish a connection of the wheel brake with the pressure line 17 or 18, respectively, and the relief line 21 terminating into the supply reservoir 9.

Furthermore, the brake system includes two pumps which deliver pressure fluid out of the supply reservoir 9 through supply lines 24, 25 into the pressure line 17, 18 (first pressure fluid conduit). Interposed into the supply lines 24, 25 are non-return valves 26, 27 which shut off toward the pumps. The pumps are driven by a common motor M. Branching off at the pump outlets are pressure fluid lines 28, 29 which lead to the shut-off valves 30, 31 arranged at the tandem master cylinder housing 2 (second pressure fluid conduit). One valve 31 is shown only schematically, and is of the same structure as valve 30 which will be described in more detail hereinafter. The pressure fluid line 29 terminates in a prechamber 32 which communicates with an outlet chamber 33 through a passage 34. The outlet chamber 33, in turn, is in communication with the annular chamber 6 through a housing chammel 35. The prechamber 32 houses a valve ball 36 which is urged by a spring into sealing engagement with passage 34. Counteracting this spring force is a tappet 37 which cooperates with the pistons 4 or 5. The piston has different diameters in the area of the annular chamber 6. In a first area 38, the diameter is sized such that the tappet 37 abutting there is shifted in the direction of the valve ball 32 so far that the ball lifts from the passage 34 and establishes a pressure fluid connection between the chambers 33 and 32. In a further area 39, the diameter of the piston is chosen to be such that the tappet does not move to abut on the valve ball 32. A ramp 40 is designed at the transition between the two areas 38, 39.

The embodiment according to FIG. 2 corresponds to the embodiment according to FIG. 1. A cam 41 is designed at the pistons 5 and 6, whereby the tappet 37 is constantly kept at a distance from the valve ball 36. Only if the piston 4 or 5 is displaced so far that the cam 41 touches the tappet 37 will the valve ball 36 be shifted to the end of the opening passage 34.

The slip-controlled brake system operates in the following manner:

In the brake's release position, all parts of the master cylinder are in their illustrated positions, and the valves are in their switch positions shown. Upon application of the brake, the push-rod piston 4 is displaced so that the central valves 12, 13 close and an amount of pressure corresponding to the pedal force is built up in the working chambers 10, 11 which pressure is delivered through the pressure lines 17, 18 to the wheel brakes. When the non-illustrated slip-monitoring device detects that any one of the wheels tends to lock, the motor M will be switched on, and the pumps 22, 23 deliver fluid into the lines 24, 25.

In the system of FIG. 1, distinction must be made between two cases:

(a) When braking is performed in the presence of low friction values (that is, in the presence of low pressures in the master cylinder 1) corresponding to small displacement travels of the pistons 4 and 5, the tappet 37 remains in abutment on the area 38 so that the shut-off valves 30, 31 are opened. The pumps deliver pressure fluid into an open-center cycle, namely through the supply line 24, the pressure fluid line 29, the prechamber 32, the outlet chamber 33, the channel 35, the annular chamber 6, the bore 7, the outlet 8 into the supply reservoir 9 (second pressure fluid conduit). From there, the pressure fuid is supplied to the pump inlet again.

In order to permit the imminently locking wheel to re-accelerate, the corresponding inlet valve 19 will be closed, and the outlet valve 20 will be opened so that the pressure fluid in the supply reservoir 9 can relieve and the wheel is no longer pressure-loaded. When the slip-monitoring device detects that the imminently locking wheels has re-accelerated, the valves 20, 19 will be switched over so that renewed pressurization of the wheel is possible. For this purpose, pressure fluid is introduced out of the corresponding working chamber 10, 11 since the pumps 22, 23 are still delivering into an open-center cycle. Consequently, the pistons 5, 6 are displaced, whereby they reach an area after one or more control cycles in which the tappet 37 has moved beyond the ramp 40 and becomes situated in the area 39. The valve 30 or 31 will be closed so that now the corresponding pump 22, 23 will no longer deliver fluid into the open-center cycle, but rather into the working chamber 10 or 11 or, respectively, into the corresponding wheel cylinders for slowing down of a wheel. The pressure fluid supplied into the working chambers 10, 11 will displace the pistons again in such a fashion that the valve 30 or 31 re-opens. Since the tappet 37 is actuated by the ramp 40, a control sequence will result, whereby the pistons 4 and 5 ramain in a position corresponding to the position of the ramp 40 and the pressure fluid, which is in each case delivered in excess of the required volume, is fed into the second pressure fluid conduit to the supply reservoir. That is to say, when braking is carried out in the presence of low frictional values, the pedal will be depressed a short distance of travel until the position corresponding to the position of the ramp 40 is reached; and (b) When braking is performed with high frictional values, the pistons 4, 5 are displaced such that tappet 37 is in the area 39. With the valve passage 34 closed, the delivered pressure fluid volume will not be supplied into the cycle upon commencement of slip control action, but rather immediately into the working chambers 10 and 11, as a consequence whereof the pistons are reset until the tappet 37 is actuated by the ramp 40. This position of the piston is maintained.

A distinction is made between two cases in regard to the embodiment according to FIG. 2 as well. If the tappet 37 is still on the left side of the cam 41 (when viewing the drawing) upon the commencement of slip control, pressure fluid out of the pumps 22, 23 is supplied into the working chambers 10, 11, whereby the pistons are displaced into their initial positions. The central valves open, namely by assuming a throttling position so that the pressure fluid flow is just such that a pressure proportional to pedal force is maintained in the pressure chambers 10, 11.

When the tappet 37 is on the right side of the cam 41, as viewed in the drawing, pressure fluid out of the pumps 22, 23 is fed into the working chambers 10, 11, in consequence whereof the pistons 4, 5 are reset up to the position corresponding to the cam 41. The valves 30, 31 open in this position, whereby the pumps 22, 23 deliver into an open cycle and the pistons 4, 5 remain in the position they reached. The width of the cam 41 is chosen such that the tappet 37 will not move onto the left side of the cam 41 during the control action, which would cause complete resetting of the piston.

Accordingly, two alternatives are available when utilizing the inventive idea. When the embodiment according to FIG. 1 is utilized, the brake pedal is always adjusted to a medium position during a control action. That means that the pedal is depressed through its full travel on a braking at a low frictional value and/or is reset on braking at higher frictional values.

In the embodiment according to FIG. 2, the pedal is always reset, namely on braking at higher frictional values into a medium position and on braking at lower frictional values into the initial position. The medium position, i.e., the position of the ramp 40 or the cam 41, is chosen such that, upon failure of the pressure fluid pump, sufficient reserve volume of fluid remains in the working chambers 10, 11 in order to carry out a conventional emergency braking. In any case, the inventive construction avoids requiring that the pedal be reset over the entire possible pedal travel as is required in brake systems according to the prior art.

What is claimed is:

1. A slip-controlled brake system comprising a master brake cylinder having at least one working chamber communicating with a supply reservoir in a brake release position, at least one hydraulic pump having a suction side connected with the supply reservoir and a pressure side connected with the working chamber through a first pressure fluid conduit, wheel brakes hydraulically connected either with the working chamber or with the supply reservoir by inlet and outlet valves controlled by a slip control means wherein the pressure side of the pump communicates with the supply reservoir through at least one second pressure fluid conduit in which at least one shut-off valve is inserted, and said shut-off valve is opened or closed dependent on the position of an operating piston in said working chamber.

2. The brake system as claimed in claim 1, wherein the shut-off valve opens the second pressure fluid conduit when the operating piston is disposed between its initial position in the brake's release position and a controlled position which is different from the initial position.

3. The brake system as claimed in claim 1, wherein the shut-off valve opens the second pressure fluid conduit when the operating piston is disposed in a control position which is different from the initial position.

4. The brake system as claimed in claim 1, wherein the shut-off valve comprises a closure member which cooperates with a ramp-actuated or cam-actuated tappet.

5. The brake system as claimed in claim 4, wherein the ramp and/or the cam is provided on the operating piston.

6. The brake system as claimed in claim 1, wherein the second pressure fluid conduit leads to an annular chamber in the master cylinder formed at the operating piston.

7. The brake system as claimed in claim 1, wherein the shut-off valve is arranged at the master cylinder housing.

8. The brake system as claimed in claim 1, wherein the brake system includes two brake circuits.

9. The brake system as claimed in claim 8, wherein the master cylinder is a tandem cylinder including two working chambers each communicating with a different one of two pumps.

10. The brake system as claimed in claim 8 including another second pressure fluid conduit connected to said second working chamber and another shut-off valve in said second pressure fluid conduit, wherein each pump delivers fluid into respective second pressure fluid conduits.

11. The brake system as claimed in claim 10, wherein one shut-off valve is operated by a push rod piston and another shut-off valve is operated by a floating piston in the second of said two working chambers.

* * * * *